United States Patent
MacKelvie

(10) Patent No.: US 7,121,368 B2
(45) Date of Patent: Oct. 17, 2006

(54) BI-DIRECTIONAL AUTOMOTIVE COOLING FAN

(76) Inventor: Winston MacKelvie, P.O. Box 1156, 20 Kimball Road, Knowlton, Quebec (CA) J0E 1V0

( * ) Notice: Subject to any disclaimer, the term of this patent is extended or adjusted under 35 U.S.C. 154(b) by 0 days.

(21) Appl. No.: 10/413,900

(22) Filed: Apr. 14, 2003

(65) Prior Publication Data

US 2003/0183433 A1   Oct. 2, 2003

Related U.S. Application Data

(63) Continuation-in-part of application No. 09/849,962, filed on May 4, 2001, now abandoned.

(60) Provisional application No. 60/203,072, filed on May 9, 2000.

(51) Int. Cl.
B60K 11/00     (2006.01)

(52) U.S. Cl. .................. 180/68.1; 180/68.2; 180/68.4; 123/41.12

(58) Field of Classification Search ............... 180/68.1, 180/68.2, 68.3, 68.4; 123/41.12, 41.49; 165/266, 271
See application file for complete search history.

(56) References Cited

U.S. PATENT DOCUMENTS

| | | | | |
|---|---|---|---|---|
| 2,191,599 A * | 2/1940 | Valletta | ...................... | 180/68.1 |
| 4,313,402 A * | 2/1982 | Lehnhoff et al. | ......... | 123/41.12 |
| 4,858,565 A * | 8/1989 | King | ........................ | 123/41.31 |
| 4,979,584 A * | 12/1990 | Charles | ...................... | 180/68.1 |
| 5,122,034 A * | 6/1992 | Isert | ............................. | 416/167 |
| 5,133,302 A * | 7/1992 | Yamada et al. | .......... | 123/41.12 |
| 5,711,387 A * | 1/1998 | Murata et al. | ............. | 180/68.1 |
| 6,016,774 A * | 1/2000 | Bokkers et al. | ............ | 123/41.1 |
| 6,076,488 A * | 6/2000 | Yamagishi | ............... | 123/41.12 |
| 6,142,213 A * | 11/2000 | Gallivan et al. | ............. | 165/41 |
| 6,155,335 A * | 12/2000 | Acre et al. | ..................... | 165/41 |
| 6,178,928 B1 * | 1/2001 | Corriveau | ................ | 123/41.12 |
| 6,227,153 B1 * | 5/2001 | Till | .......................... | 123/41.12 |

(Continued)

Primary Examiner—Christopher P. Ellis
Assistant Examiner—Christopher Bottorff

(57) ABSTRACT

The instant invention pertains to a road vehicle's axial flow cooling fan which normally draws cooling air from in front of the vehicle and blows it into the engine bay. The instant invention includes a control circuit for the fan motor that provides variable speed and bi-directional, or reverse and normal, fan operation. Reverse fan operation blows air from the engine bay through the radiator and out the front of the vehicle, and normal fan operation blows into the engine bay. Two input sensors feed the control circuit, one for road speed of the vehicle and other for engine temperature. When the engine is below its operating temperature and the vehicle is moving, the fan is made to blows in reverse at a speed proportional to road speed so as to block cold ram air from entering and blasting onto a warming engine. This speeds engine warm-up to reduce emissions, improve fuel economy, and speed windshield defogging. The fan may also be made to blow in reverse when the engine is cold and the vehicle is stopped, in order that exhaust-heated air from the exhaust manifold behind the engine, may be drawn forward over the engine block to speed its warming. When the engine is above its operating temperature and the vehicle is idling or moving slowly, as in traffic, then the control circuit causes the fan to again blow in reverse cooling both the radiator and the engine bay components and preventing hot, noxious fumes from vehicles in front from being drawn into the vehicle. Blowing in reverse in traffic conditions also eliminates hot air looping back to the front of the car and drawn in through the radiator. As vehicle speed increases, the fan is made to revert to normal operation augmenting ram air flow through the radiator.

2 Claims, 1 Drawing Sheet

U.S. PATENT DOCUMENTS

| | | | |
|---|---|---|---|
| 6,349,882 B1 * | 2/2002 | Kita et al. | 236/34 |
| 6,390,217 B1 * | 5/2002 | O'Brien et al. | 180/68.6 |
| 6,435,264 B1 * | 8/2002 | Konno et al. | 165/41 |
| 6,439,850 B1 * | 8/2002 | McCallum et al. | 416/144 |
| 6,467,538 B1 * | 10/2002 | Acre et al. | 165/266 |
| 6,470,838 B1 * | 10/2002 | Ap et al. | 123/41.12 |
| 6,481,388 B1 * | 11/2002 | Yamamoto | 123/41.12 |

* cited by examiner

BI-DIRECTIONAL AUTOMOTIVE COOLING FAN

The present application is a continuation-in-part of application Ser. No. 09/849,962 filed May 4, 2001, now abandoned which is a non provisional application of provisional application No. 60/203,072, filed May 9, 2000.

FIELD OF THE INVENTION

The instant invention uses engine temperature and vehicle road speed sensors that input to a fan motor control circuit to add both bi-directional rotation and speed of rotation control of the fan for the purpose of blowing air forwards and outwards from the front of the vehicle under certain driving conditions. Brush-type, direct current motors of the type that drive cooling fans, can be run in reverse by switching polarity.

BACKGROUND OF THE INVENTION

Cold engine operation has numerous disadvantages. Due the rich fuel mixture which must be burnt, fuel consumption is higher, exhaust is dirtier and contains larger amounts of unwanted pollutants, and, the excess fuel dilutes the oil film lubricating the piston-cylinder surfaces causing excessive wear as well as contaminating the oil. Further, engine-heated water is required to defrost/defog the windshield for best visibility for safe driving. All the above disadvantages are minimized at the preferred engine operating temperature range of about 200–210° Fahrenheit (94–98° C.). Consequently, this temperature should be attained as quickly as possible from cold (cold can be below −40° F., ° C.).

Once the engine has reached operating temperature it thereafter produces large amounts of unwanted waste heat that must be dissipated to prevent overheating. This heat is dissipated both by the radiator and by the surface of the engine into the ram air flow that enters the front grill as the vehicle is driven. At idle or in slow moving conditions there is no ram air flow so the fan switches on and off to create air flow at intervals when needed according to engine temperature sensor signal. However the engine surface now receives hot radiator air and so cannot be cooled as effectively as when driving at speed. Further that hot air unwantedly heats the engine bay components and is then discharged beneath the vehicle's front portion wherefrom a portion of the hot air finds its way back to the front intake. Moreover, during the fan's off interval, the engine bay or underhood compartment receives no cooling air and so the components therein soak up heat and must therefore operate at quite high temperatures. These underhood temperatures can reach critical values in long traffic on hot days. Breakdown of the plastics and electronics in the engine compartment becomes a serious concern. Furthermore the passenger cabin has a forward portion or wall (firewall) which receives this unwanted heat in hot weather. This adds to interior heat which the air conditioner must work harder at to cool down. These anomalies add to the cooling load of the radiator which must therefore be larger, heavier and more expensive. Moreover, the engine bay and its contents, including electronic, electric, computer and numerous plastic components all get very hot reaching temperature well over the boiling point of water (220° F., 105° C.) and so must be made of select, expensive materials to withstand the high temperatures.

Future vehicle development plans include attaching more related components directly on the engine to allow complete package testing. This is expected to further raise underhood component temperature and therefore their cost.

SUMMARY OF THE INVENTION

The present invention is an improvement to vehicles having a water cooled, front-mounted engine with front mounted engine coolant radiator. Such vehicles commonly have an axial flow fan mounted parallel to, planar with, and attached adjacent to said radiator. Sometimes dual, side-by-side fans are used to reduce height requirements. The direction and speed control of such fans is the subject of the present invention.

Prior art in the field to Kita (U.S. Pat. No. 6,349,882) discloses a reversing cooling fan for earth moving equipment that uses engine speed as an input sensor. However in a road vehicle, a transmission or gearbox attached to the engine output shaft, enables vehicle road speed to increase while engine speed decreases. This decoupling of engine speed and road speed is necessary in road vehicles so that the engine can achieve the required fuel economy, power output, operational noise, and mechanical wear. Because of this, engine speed cannot be used in the instant invention to control fan speed and direction. Only road speed will allow the fan's rotational speed (and thus the forward speed of air exiting the vehicle's front opening) to match the speed of ram air entering the opening that changes as the vehicle changes speed.

As background to the above, the Apr. 2003 issue of ROAD&TRACK MAGAZINE has the following data for LAND ROVER's 2003 RANGER ROVER HSE rad vehicle: in first (starting) gear, vehicle speed can range between 0 MPH to a maximum of 38 MPH with engine speed rising from idle RPM to 6,000 RPM (maximum). Since ram air speed equals road speed, the ram air speed in first gear can also increase from 0 MPH to 38 MPH at those same engine speeds.

Shifting into second gear, the maximum possible road speed (and ram air speed) increases to 62 MPH at the same 6,000 RPM. This upward change of road speed (and ram air speed) at a given engine speed continues in each successive gear. In final fifth gear a top speed of 130 MPH is achieved at 4,600 RPM or 35 RPM for every MPH. Thus in fifth gear, 38 MPH vehicle and ram air speed would be achieved at 1,085 RPM (just over idle), as opposed to the 6,000 RPM required in first gear. In the above example, the fan speed required to counteract ram flow air at, say, 10 MPH, would be the same in any of the five gears even though the engine speed varies by a factor of about 6 making road speed the only speed sensor of value for the instant invention.

Stated otherwise, the speed of the ram flow air is a function of road speed and not engine speed, it follows that the speed of rotation of the axial flow electric cooling fan of the present invention must be governed by road speed such that, when the engine is too cold, the ram air flow will be counteracted to prevent blasting onto the warming engine, and, when the engine is too hot and the vehicle's road speed exceeds a specified value, the direction of rotation will change so as to assist ram cooling air flow.

Thus the instant invention uses sensors from both road speed and engine temperature to provide inputs to the fan control circuit so that the fan may be properly controlled and achieve the results desired.

When the engine is below operating temperature and the vehicle is moving, faster warm-up is achieved with the instant invention by operating the axial fan in reverse to blow air forwards out of the front of the vehicle thereby blocking cold ram air from blasting onto the warming engine. The speed of the fan may preferably be varied according to the speed at which the vehicle is being driven. When the vehicle stops the fan stops blowing forwards. When the vehicle speeds up so does the fan, always blowing at a rate proportional to (or a function of) the vehicle's road speed. When engine operating temperature is attained, fan operation ceases.

When the engine is cold and the vehicle is stopped, the fan may also be made to blow forward at an intermediate speed. This will cause exhaust-heated air from the exhaust manifold behind the engine, to be moved forwards over the engine block to speed its warming.

When the engine is too hot and the vehicle is stopped or moving slowly, improving cooling is achieved with the instant invention by again operating the fan in reverse to blow air forwards (preferably at full speed). This draws outside air from beneath the vehicle and through the engine bay thereby cooling the engine surface, components in the engine bay, and the firewall of the vehicle's interior.

All these benefits are achieved at a lower net vehicle cost (lower cost underhood components and materials from lower underhood temperatures, smaller radiator) and without adding new structures.

Motor control circuits for automotive fan motors are well known. It is also well known that the typical brush DC (direct current) may be reversed simply by switching its electrical connection, and, that axial fans work in both directions although fan blade designs are generally optimized for one direction. The present invention therefore applies to existing vehicles refitted to blow forwards. Such fan blades may be designed to operate equally in both directions.

In the present invention, determination of mode of operation of the cooling fan (to blow forward or reverse (motor rotating clockwise or counterclockwise), and the speed of such rotation, are made by an electronic motor control circuit of a design well known in the art (such as Hexfet Applications, Motor Drives, p.43 from International Rectifier of El Segundo Calif.). Inputs from appropriate sensors (also well known in the art) provide the control circuit engine with temperature data and vehicle road speed data.

The present invention speeds warm-up as follows: at below operating temperatures, a temperature sensor signal (where the signal voltage is a function of engine operating temperature) 'tells' the control circuit to select reverse mode fan operation. If and when the vehicle begins moving, a speed sensor 'tells' the control circuit the vehicle speed which the control circuit uses to start the fan turning and to continually adjust the fan's speed to be proportional to the vehicle's road speed (up to maximum fan speed). Thus the fan blows air forwards with the proper force to 'just block' cold air coming in through the inlet. If the vehicle speeds up, so does the fan. If the vehicle slows and/or stops, so does the fan. By this means the fan constantly 'just blocks' the ingress of unwanted cooling air, speeding engine warm-up.

The fan may also be made to blow forwards at low vehicle speed or while the vehicle is idling to bring at least some exhaust-heated air forward through the engine bay to further speed engine warm-up.

The present invention improves cooling as follows. If a vehicle is operated below a predetermined road speed (slow moving traffic) and the engine gets too hot, then, a speed sensor (for example, a conventional variable reluctance sensor located in the transmission) 'tells' control circuit to select reverse mode causing fan to blow forward, cooling radiator and engine bay. The fan may operate at full speed during this operational condition. If vehicle continues to operate too hot but road speed increases above a pre determined maximum speed range of, say, 20–25 mph (32–40 kph), the the speed sensor 'tells' control circuit to switch to normal mode (blowing rearwards) to augment ram air flow. A short time delay may be incorporated in the motor control circuit to allow the fan to momentarily stop before changing directions. The upper exact speed range limit would partly depend on the speed of the fan's air flow. The shape and length of the front grilled opening and the fan location are other determinants of the maximum speed range above which the fan is 'told' to change to blowing normally or rearwards to assist ram air flow.

Vehicles in stop-and-go traffic exhaust their hot, noxious fumes rearwards towards vehicles behind. With the existing cooling fan arrangement, these fumes are drawn into the engine bay and vehicle interior, especially when heater and/or air conditioner fans are operating inside the vehicle, or windows are open. Thus vehicle occupants unwittingly inhale toxic fumes.

The present invention solves this serious situation by having the fan blow its cooling air, and any noxious fumes, forwards away from vehicle and occupants.

Underhood objects such as plastic and electrical components can reach critically high temperatures. Plastics, rubbers, paint, hoses, electronics, fluids and other components may overheat, dry out, warp, or age quickly, requiring more expensive materials to resist the increasingly high temperatures. With the existing cooling fan arrangement, hot radiator air is blown into the hot engine bay adding to underhood temperatures.

With the present invention hot and noxious underhood air and, hot radiator air, are blown out the front inlet of the vehicle while fresher, cooler air is drawn into the engine bay from below and beside.

Another use of the present forward blowing fan at zero or slow road speeds, is to provide a continual cooling of the engine bay from the radiant and convective heat given of by the engine's surface. In this application, the fan may run at a low speed until high engine temperatures trigger full speed fan operation.

To control the speed of rotation of the fan in warm-up mode, a vehicle speed-based signal to the control circuit from a sensor is needed. Such a signal may be generated by any of numerous types of sensors or transducers. They include an electrical signal generated by an existing speedometer transducer; air flow measurement devices such as pitot tubes and anemometers; a flap on a shaft that is rotated by ram air flow, the rotation of which is detected by a potentiometer or Hall-effect sensor; microphone tuned to sound generated by air flow including over resonant tube or reed; air pressure sensors; antenna deflection; and power sensing of fan motor as it is impinged upon by ram air which it is forcing against. Even the sensor used in antilock brake systems to detect wheel rotation may provide a suitable signal.

Speed control of the fan in reverse mode is important during warm-up because rotating too fast would draw excessive cold ambient air over the engine from openings below and about the engine bay. Rotating too slow in reverse mode would allow cold ram air to enter with the same result. As the car's speed varies from zero to full speed, the fan must adjust it's speed accordingly to maintain a null air flow over the warming engine. Some benefit can be had with a simpler system of merely operating the fan at full reverse speed while warming up, especially if the vehicle will reach substantial speeds soon after startup. This will provide some worthwhile air blocking at minimal cost, i.e., no speed sensor or control circuit.

Air flow speed sensors may be placed in preferred locations on, in, or about the vehicle including obvious locations in the front of the fan, and, in selected area such as at the lower edge of the windshield where air flow from the engine may be more stable, or at vents affected by external air flow such as in a tail light, or behind the rear window, or from and antenna mounted device. Sensors may also include thermistors, resistors whose resistive value changes predictably with temperature.

Thermistors may be powered so that they generate heat. Such thermistors are therefore cooled by an air flow over them. This cooling at any given temperature is dependent on air flow speed, and so the change in resistance produced by the cooling is proportional to the air speed over the thermistor. This, in turn, provides the needed signal source for the fan speed control circuit. In one embodiment of the present invention, two such powered thermistors are placed back-to-back in the inlet air stream. That is, one faces forwards to the inlet opening, the second faces rearward to the cooling fan. If both thermistors cool equally then inlet air flow is stagnant (vehicle stopped or fan counteracting inlet air flow) and both are losing heat evenly. If air flow from the inlet exceeds that from the forward blowing fan, then the first front-facing thermistor will be in direct contact with a faster moving air stream and so will cool faster than the rear-facing thermistor which will be in an aerodynamic air shadow, and so cool more slowly. This differential resistive condition provides the signal to the fan speed control circuit to speed up the fan. If air flow from the reverse-blowing fan exceeds that from the inlet, then the second rear-facing thermistor will be in direct contact with a moving air stream and so, will cool faster than the the front-facing thermistor which will be in an aerodynamic air shadow and so, cool slower. This differential condition likewise provides the signal to the fan speed control circuit to slow down the fan.

Pressure sensors may include means to detect when intake pressure is at its highest indicating blocked air flow, the desired goal, and where a pressure transducer, or a differential pressure transducer, supplies the signal to the fan speed control circuit.

Axial motor fan blades are produced in two forms: 'push' or 'pull' the choice depending on whether the fan is mounted in front of the radiator (push) or behind the radiator (pull). To ensure adequate engine cooling and air blocking capability with the present invention, the fan's blade design should be selected to maximize air flow dynamics in the reverse or forward blowing direction although a neutral design would also be acceptable. Ram air flow from vehicle speed augments the air flow of a fan blowing rearwards (normal mode), it is therefore a less demanding air moving condition and so the 'wrong' blade design can work. This means that retrofitting existing vehicles with the present invention may be accomplished with only a low-cost control circuit and speed sensor. A bi-directional neutral fan blade design may also be used.

DETAILED DESCRIPTION OF THE INVENTION

In FIGS. 1–5 and 7, air velocity/pressure is shown by arrow-headed straight lines wherein longer lines represent higher speed (or force) and arrowheads show direction of fan air flow 3 and ram air flow 4.

Figure 1:
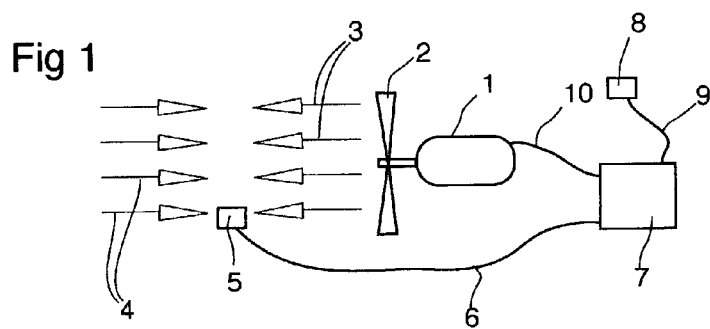
FIG. 1 Shows the fan in reverse mode producing a air flow sufficient to prevent air entrance through vehicle's grill and the control circuit to adjust speed and to determine reverse operation mode from sensors.

Referring to FIG. 1 electric motor 1 drives fan blades 2 in reverse mode creating a forward fan air flow 3 opposite in effect to the inlet ram air flow 4 created by vehicle's road speed. When flows (or pressures) 3 and 4 are equal and opposite, there is zero net air flow into engine bay (not shown) and onto cold engine. Fan motor 1 is powered by control circuit 7 through wire 10. Circuit 7 receives 'too cold' temperature signal from engine temperature sensor 8 via wire 9. In a preferred embodiment, control circuit 7 may also receive vehicle's road speed signal from vehicle road speed sensor 5 via wire 6. Vehicle road speed may be sensed from ram air speed (shown in FIGS. 1, 4, 5), electronically (one example shown in FIG. 6), or fan motor power variations (not shown). When used to speed engine warmup, speed sensor 5 signal is used by the control circuit 7 to adjust fan speed higher or lower in accordance with vehicle speed to create a null flow through the vehicle's front opening and onto the engine when engine is cold (below preferred operating temperature range). When used to cool overheating engine, speed sensor 5 enables control circuit to select normal or reverse fan rotation mode according to vehicle speed relative to a predetermined vehicle road speed range. Speed sensor 5 may be chosen from a variety of sensors that work with air flow including pitot tube (not shown), anemometer (not shown), microphone (not shown), thermistors (FIG. 5), pivoting flap (FIG. 4), or road speed speedometer/transmission mechanisms and sensors (FIG. 6), or inlet air pressure transducers (nor shown).

Figure 2:
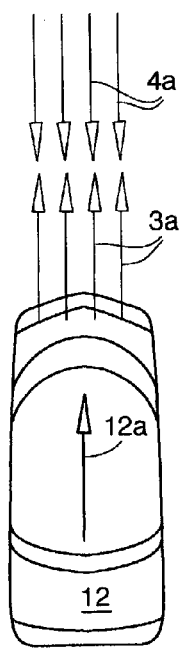
FIG. 2 A top view of a vehicle at a first road speed showing the long arrows of vehicle air speed and the canceling counter flow of equal value provided by the cooling fan operating in reverse mode.
Figure 3:
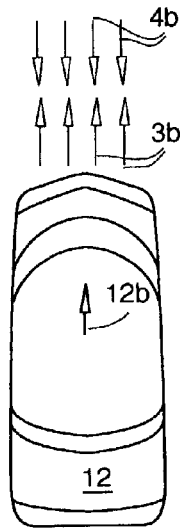
FIG. 3 Same as FIG. 2 where both grill inlet air speed and fan air speed are substantially equal and lower than in FIG. 2.

In FIG. 2, vehicle 12 (viewed from above) at a first vehicle road speed 12a causes ram inlet air flow 4a, which is counteracted or blocked by forward fan air flow 3a produced by the fan operating at a one speed. In FIG. 3 vehicle 12 at a second and slower speed 12b creates smaller ram inlet air flow 4b, which is counteracted or blocked by proportionally reduced forward fan air flow 3b produced by the fan operating at a slower speed. In FIGS. 2 and 3 the blocking is shown to occur in front of the vehicle only for clarity. The blockage of air flow may occur anywhere in front of the fan or at least in front of the engine. This blocking of ram inlet air flow achieves the desired goal of faster engine warm-up.

Figure 6:
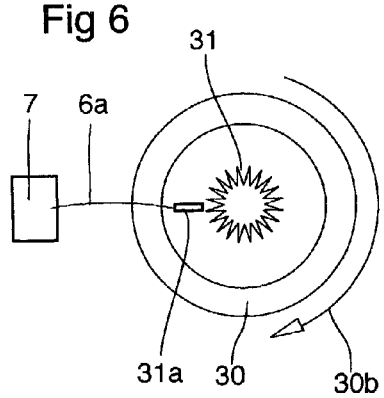
FIG. 6 shows a speedometer-based speed control circuit with second sensor detecting speed of rotation of a wheel or gear.

In FIG. 6 is shown a wheel speed sensor 31a (such as an anti-lock brake sensor) in in proximity to toothed wheel or gear 30 rotating at a speed 30b. Sensor 31a feeds speed related signal via wire 6a to fan motor speed control circuit 7. Thus as the vehicle's wheel rotates, second sensor 31a continually detects the speed and supplies a proportional signal to fan speed control circuit 7 for fan speed adjustment.

Figure 4:
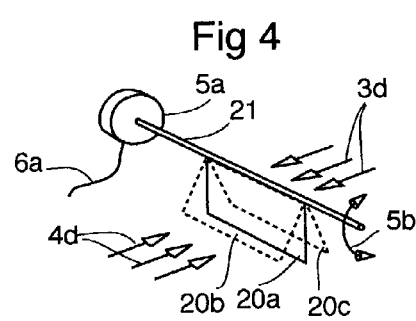
FIG. 4 shows a mechanical flap air speed sensor.

FIG. 4 shows a simple light weight mechanical flap 20a on axle 21 connected to angular detector 5a which may be a potentiometer, or Hall-effect detector. Flap is made light so as to not be overly affected by vehicle acceleration and deceleration. As flap 20a moves fore 20b and aft 20c in reaction to inlet air flow 4d and forward fan air flow 3d, axle 21 likewise rotates 5b turning detector 5a which provides fan speed correction signal via wire 6a. While the flap-shaft is shown in a horizontal position, it may be set vertically or at any preferred angle.

Figure 5:
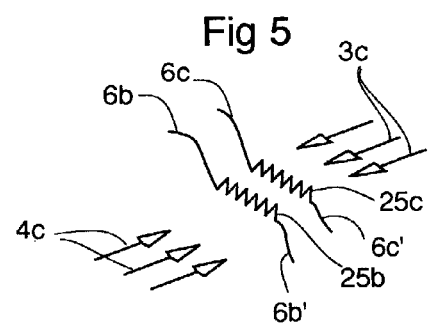
FIG. 5 shows a thermistor-based air speed sensor.

FIG. 5 shows a thermistor based sensor where ram inlet air flow 4c impinges on front-facing thermistor 25b and forward fan air flow 3c impinge on rear-facing thermistor 25c. Each thermistor 25b and 25c are powered through leads 6b, 6b' and 6c, 6c' respectively. A change in thermistor resistance is a direct function of cooling air flow over thermistor. Excess air flow in either direction provides one thermistor with more cooling which, in turn, establishes a differential resistance signal proportional to road speed. The constantly changing differential resistance values of the two thermistors provides speed correction signal to fan motor speed control circuit 7.

Figure 7:
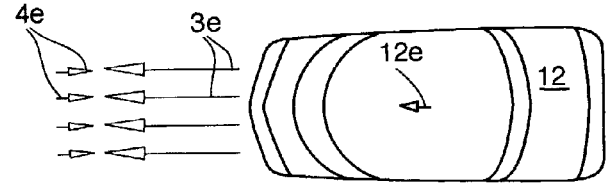
FIG. 7 shows the fan at full speed in reverse mode effect during engine overheating at low speed or idling at stop.

FIG. 7 shows the reverse fan blowing air 3e at full force while vehicle 12 is stopped, or starting and stopping, or moving slowly in traffic and coolant temperature is too high.

The above specification discloses the basics of the present invention so that anyone skilled in the art may reduce it to practice. Other details may be included in such practice without detracting from the spirit of the invention.

I claim:

1. In a vehicle having a front engine bay with an engine located therein, a radiator having a coolant circulating therein, and an axial flow cooling fan for circulating air through said radiator;

the improvement comprising:

a motor operative to drive said axial flow cooling fan in both a forward and a reverse direction, said forward direction being one wherein said fan blows air from said radiator through said engine bay;

temperature sensing means for measuring the temperature of said coolant and to provide a temperature signal responsive thereto;

vehicle speed sensing means for measuring the speed of the vehicle and to provide a vehicle speed signal; and a control circuit to receive said temperature signal and said vehicle speed signal and to control the direction of operation of said axial flow cooling fan in response to said signals, said control circuit being operative to cause said fan to operate in a reverse direction when said vehicle is moving above a predetermined speed and said temperature is below a first preset level; said control circuit also being operative to cause said fan to operate in a reverse direction when said vehicle is moving below a predetermined speed and said temperature is above a second preset level.

2. The improvement of claim 1 wherein said control circuit is operative to control the speed of said axial flow cooling fan according to said vehicle speed signal.

* * * * *